UNITED STATES PATENT OFFICE 2,408,518

THIOPHAN-3-ONE AND PROCESS FOR THE MANUFACTURE OF SAME

Paul Karrer, Zurich, Switzerland, assignor to Hoffmann-La Roche Inc., Nutley, N. J., a corporation of New Jersey No Drawing. Application March 22, 1943, Serial No. 480,090. In Switzerland April 16, 1942

2 Claims. (Cl. 260—329)

It has been found that hitherto unknown thiophan-3-ones can be manufactured from dihalogenated ketones of the formula

wherein $R_1$, $R_2$, $R_3$, $R_4$ are selected from the group consisting of hydrogen, alkyl, aralkyl or aryl, and X and X' are selected from the group consisting of halogen atoms by the action of metal sulfides thereof. The reaction takes the following course:

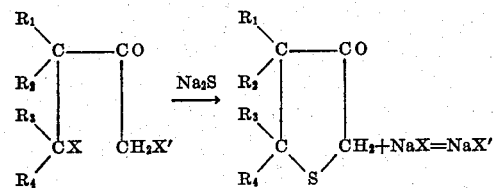

The new compounds are to be used for the preparation of therapeutically employable substances.

Example 10.2 parts by weight of 1-chloro-4-iodo-butanone-2 are dissolved in 900 parts by volume of alcohol. (1-chloro-4-iodo-butanone-2 may be manufactured by reacting β-iodo-propionic acid with thionyl chloride, transforming the β-iodo-propionic acid chloride formed into the diazo ketone with the aid of diazo methane and acting thereupon with dry gaseous hydrogen chloride; 1-chloro-4-iodo-butanone-2 has its melting point at 54° C.) To the alcoholic solution is added drop by drop during several hours a solution of 10.6 parts by weight of $Na_2S.9H_2O$ in 25 parts of water. It is advisable to displace the air in the reaction vessel by nitrogen or hydrogen. After the addition of the sodium sulfide solution the liquid is heated for one-half hour under a reflux condenser and then distilled in vacuo. The highly volatile thiophan-3-one passes with the alcohol into the receiver. The isolation of the compound is effected by adding to the distillate 9 parts by weight of semicarbazide hydrochloride and 9 parts by weight of potassium acetate, heating for two hours on a water-bath and finally driving off the solvent in vacuo. By rubbing the solid residue with a little water the thiophan-3-one semicarbazone remains behind in crystalline form and can be recrystallised from little water. It then shows a melting point of 192° C. By acid hydrolysation of the semicarbazone free thiophan-3-one is obtained as a liquid.

I claim:

1. Process for the manufacture of thiophan-3-one, comprising condensing 1,4-dihalogeno-butanone-2 with sodium sulfide, and recovering the thus formed thiophan-3-one.

2. Thiophan-3-one of the formula

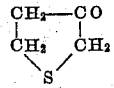

PAUL KARRER.